Jan. 22, 1957 W. M. WARREN 2,778,927
WELDING ROD HOLDER
Filed Sept. 27, 1955 3 Sheets-Sheet 1
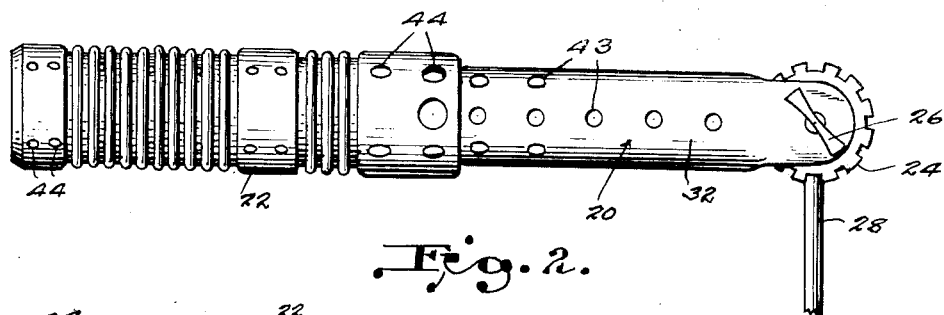
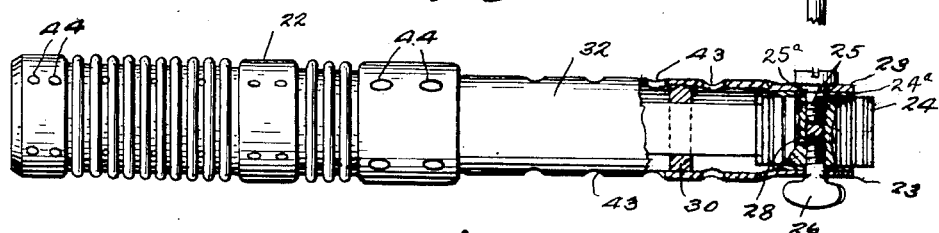
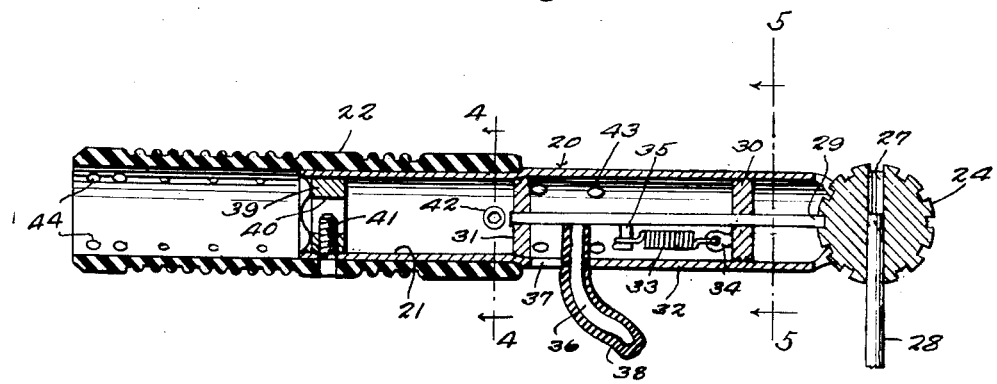
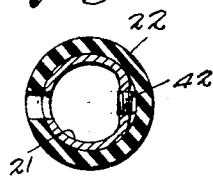
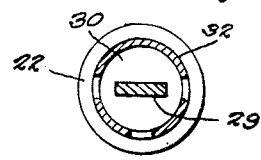
William M. Warren
INVENTOR
BY CA Snow &Co.
ATTORNEYS.

Jan. 22, 1957 W. M. WARREN 2,778,927
WELDING ROD HOLDER
Filed Sept. 27, 1955 3 Sheets-Sheet 2

William M. Warren
INVENTOR

BY *Cashnow & Cos.*
ATTORNEYS.

Jan. 22, 1957 W. M. WARREN 2,778,927
WELDING ROD HOLDER
Filed Sept. 27, 1955 3 Sheets-Sheet 3
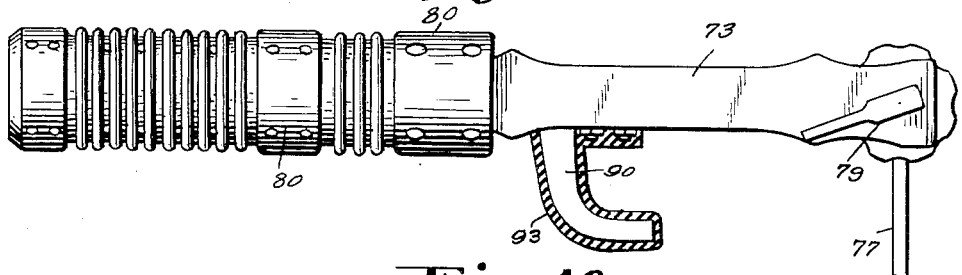
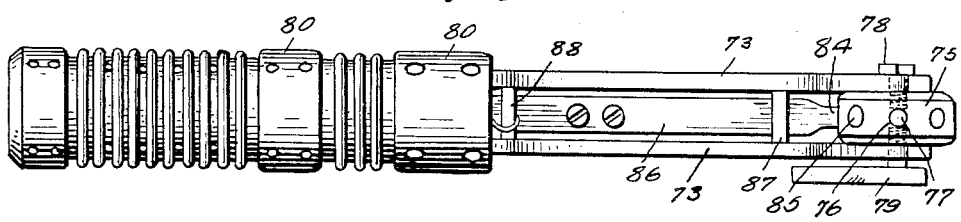
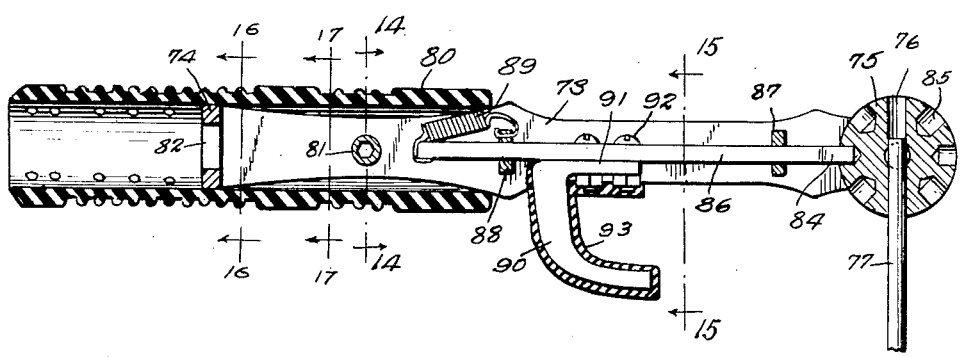
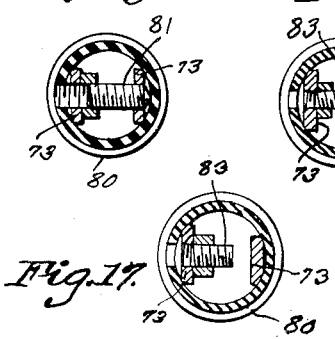
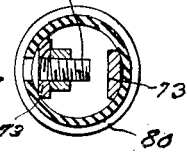
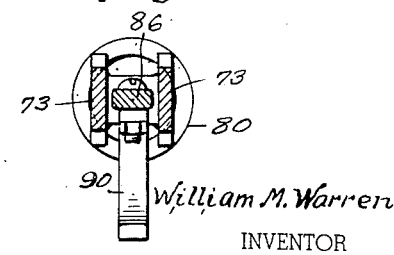
William M. Warren
INVENTOR
BY *CASnow&Co.*
ATTORNEYS.

United States Patent Office 2,778,927
Patented Jan. 22, 1957

2,778,927
WELDING ROD HOLDER
William Martin Warren, Dallas, Tex.
Application September 27, 1955, Serial No. 536,813
2 Claims. (Cl. 219—144)

This invention relates to a holder for welding rods in electric or arc welding operations.

An object of this invention is to provide an improved holder whereby the welding rod can be tightly secured and held in any selected angular position with respect to the handle.

Another object of this invention is to provide an improved welding rod holder which is safe for the operator and which includes means for cooling the holder during the use thereof.

A further object of this invention is to provide an improved holder for a welding rod which is simple in construction, light in weight and sturdy in construction.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Fig. 1 is a detail side elevation of a welding rod holder constructed according to an embodiment of this invention.

Fig. 2 is a plan view partly broken away and in section of the holder.

Fig. 3 is a longitudinal section taken through the holder.

Fig. 4 is a sectional view taken on line 4—4 of Fig. 3.

Fig. 5 is a sectional view taken on line 5—5 of Fig. 3.

Fig. 11 is a detail side elevation of another modification of this invention.

Fig. 12 is a top plan view of the device shown in Fig. 11.

Fig. 13 is a longitudinal section taken through the device shown in Figs. 11 and 12.

Fig. 14 is a sectional view taken on line 14—14 of Fig. 13.

Fig. 15 is a sectional view taken on line 15—15 of Fig. 13.

Fig. 16 is a sectional view taken on line 16—16 of Fig. 13.

Fig. 17 is a sectional view taken on line 17—17 of Fig. 13.

Figure 6:
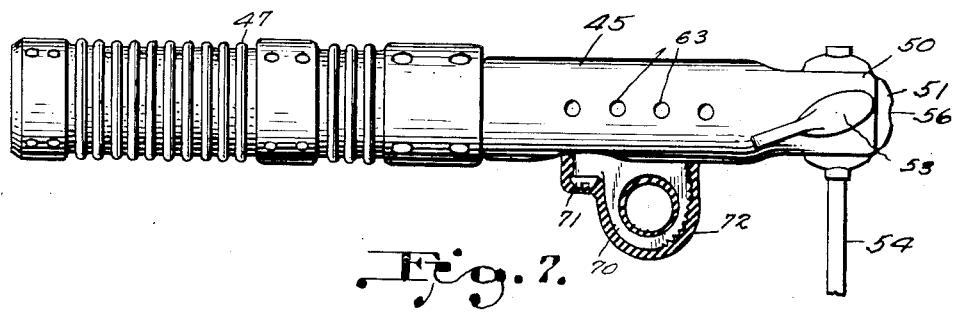
Fig. 6 is a detail side elevation partly in section of a modified form of this device.

Referring to the drawings, and first to Figs. 1 to 5, inclusive, the numeral 20 designates generally an elongated tubular frame member formed with a reduced rear portion 21. An electrically insulated sleeve or handle 22 is disposed about the reduced frame portion 21. The frame portion 21 is formed at its forward end with a pair of forwardly projecting parallel arms 23 between which a toothed wheel 24 is rotatably mounted. The wheel 24 is rotatably mounted between the arms 23 by means of a pivot screw 25 extending through one arm 23 and threaded into the wheel 24. Screw 25 is formed with a shoulder 25ª rotatable in an arm 23. A thumb screw or wing member 26 is rotatably disposed through the opposite arm 23 and is threaded into the wheel 24, as shown in Fig. 2. The wheel 24 is formed with a diametrical rod receiving opening 27 within which a welding rod 28 is adapted to engage. The wing screw 26 is adapted to bind the rod 28 in the wheel 24, in addition to providing one portion of the pivot for the wheel 24. A split friction washer 24ª is disposed at each end of wheel 24 to resiliently hold wheel 24 against rotation. The inner ends of screws 25 and 26 are cupped after the manner of set screws to bite into the surface of rod 28.

A ratchet member 29 in the form of a flat elongated rod is slidable through a pair of guide members 30 and 31 which are fixed in the forward portion 32 of the frame 20. The forward end of the ratchet member 29 is adapted to engage between a pair of selected teeth of the wheel 24. Ratchet member 29 is constantly urged forwardly to wheel locking position by means of a spring 33 which is secured at one end to an eye 34 carried by the guide 30 and is secured at the opposite end to a lug 35 which is carried by the ratchet member 29. A longitudinally curved handle or finger piece 36 is secured at one end to the ratchet member 29 and extends loosely through an opening 37 formed in the frame member 32. The finger piece 36 is covered by means of a covering 38 which is formed of rubber or other suitable electric insulating material. The rear frame member 21 has a plug 39 fixed therein which has a central opening 40 within which one end of an electric conductor is adapted to be extended, and the conductor is fixed in the plug by means of a screw 41 which is carried by the plug 39. The inner frame member 21 is exteriorly and removably disposed in the insulated handle 22 by means of a set screw 42 which is threaded through the frame member 21.

The frame member 20 is provided along the projecting portion 32 thereof with a series of holes 43 whereby the frame member 32 may be cooled about the exterior and interior surfaces thereof, and the handle member 22 which may be formed of plastic, Bakelite or other insulating material is also provided with a series of openings 44.

Figure 7:
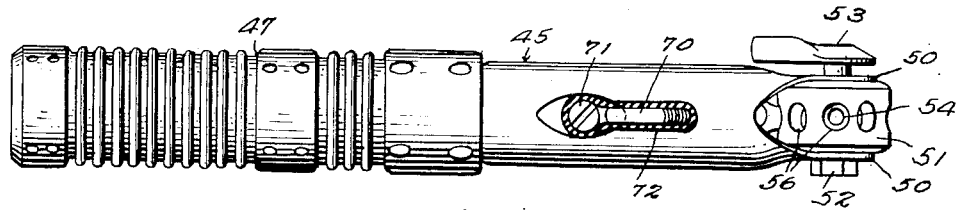
Fig. 7 is a bottom plan view of the device shown in Fig. 6.
Figure 8:
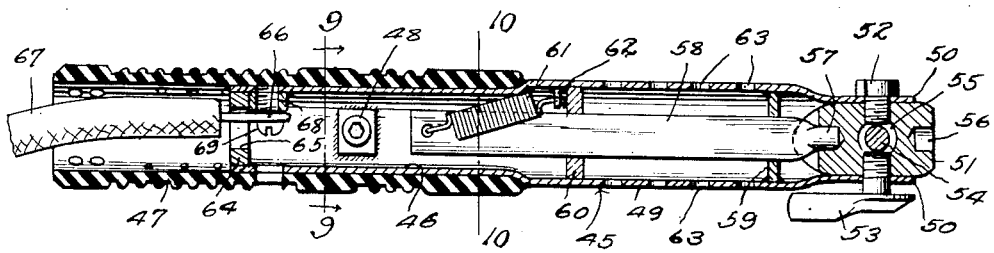
Fig. 8 is a longitudinal section of the device shown in Figs. 6 and 7.
Figure 9:
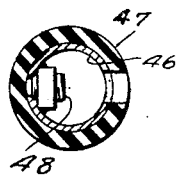
Fig. 9 is a sectional view taken on line 9—9 of Fig. 8.
Figure 10:
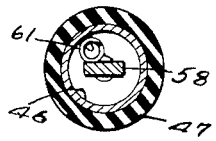
Fig. 10 is a sectional view taken on line 10—10 of Fig. 8.

Referring now to Figs. 6 to 10 inclusive, the numeral 45 designates generally an elongated tubular frame member which is formed with a reduced rear portion 46. The rear portion 46 extends into an insulating sleeve or handle member 47 and is fixed in the handle member 47 by means of a set screw 48. The frame member 45 includes a forwardly projecting tubular frame 49 having a pair of spaced parallel arms 50 at its forward end. A ratchet wheel 51 is adjustably disposed between the arms 50, being rotatably secured between the arms 50 by means of a headed screw 52 and a wing screw 53. The wing screw 53 forms with the headed screw 52, a pair of combined screws for binding a welding rod 54 which extends through an opening 55 formed in the wheel 51. The wheel 51 is provided on the periphery thereof with a plurality of sockets or keepers 56 with a selected one of which a locking bolt 57 is adapted to engage. The bolt 57 is carried by an elongated slide bar 58 which is slidable in a pair of guides 59 and 60 fixed within the frame member 49. A spring 61 is secured at one end to the rear portion of the slide bar 58 and is secured at the opposite end thereof to an eye 62, which is fixed interiorly of the frame member 49. The frame member 49 is formed with a plurality of air openings 63 whereby air may freely circulate within frame member 49. The inner frame member 46 is provided at its inner end with a plug 64 having a central opening 65 so that the exposed end 66 of an electrical conductor 67 may be extended into the rear of the frame member 45.

A boss 68 is fixed within the frame member 46 on the front side of plug 64 and a screw 69 is threaded into the boss 68 and through the conventional eye formed by the exposed portion 66 of conductor 67. The slide member 58 is moved lengthwise to release position with respect to the wheel 51 by means of a finger engaging member 70 fixed to the slide 58 by means of a screw 71. The finger engaging member 70 is insulated by means of an electric insulating covering 72.

Referring now to Figs. 11 to 17, inclusive, the numeral 73 indicates generally a pair of elongated flat bars which are disposed in spaced parallel relation and connected together at their rear ends by means of a connecting member 74. The bars 73 have disposed between the forward ends thereof a welding rod holding wheel 75 having an opening 76 within which a welding rod 77 is adapted to be secured. The rod 77 is secured by means of an opposed pair of screw members 78 and 79, the latter being a wing screw and threaded into wheel 75 for engagement with the rod 77, to secure rod 77 relative to the wheel 75. The rear portions of the frame bars 73 have secured thereabout a tubular handle 80 which is formed of electric insulating material. The handle 80 is fixed relative to the bar 72 by means of a set screw 81. The connecting member 74 is formed with a central opening 82 through which the forward end of an electrical conductor is adapted to be extended and the conductor is secured relative to the frame bars 73 by means of a pair of set screws 83 which are threaded through one of the bars 73 and bind the electric cable against the other one of the bars 73. The wheel 75 is locked in adjusted position, whereby the rod 77 may be held in any selected angular position with respect to the frame member 73, by means of a locking bolt 84 which is engageable in a selected one of a plurality of keepers 85 which are formed in the wheel 75. The bolt 84 is carried by an elongated slide bar 86 which is slidable in a pair of guides 87 and 88 which are fixed between the bars 73. The slide 86 is constantly urged forwardly to locking position by means of a spring 89 secured at one end to the slide 86 and secured at the other end to the rear guide 88. A longitudinally curved finger piece 90 formed with a base 91, is fixed by means of bolts or fastening members 92 to the slide 86. The finger piece 90 is insulated by means of an insulating covering 93.

In the use and operation of this device, referring first to Figs. 1 to 5, inclusive, the welding rod 28 is secured in the ratchet wheel 24 by wing screw 26. One end of the electric conductor is secured in the plug 39 by the set screw 41 so that electric current will be communicated to the welding rod 28. Rod 28 is adjustable angularly with respect to the length of the frame 20 by pulling finger piece 36 rearwardly to disengage ratchet or dog member 29 with respect to the teeth of wheel 24. Wheel 24 may then be rotated between the arms 23 and then locked in the adjusted position by release of finger piece 36.

The device shown in Figs. 6 to 10, inclusive, will operate similar to that shown in Figs. 1 to 5, inclusive, and the device shown in Figs. 11 to 17, inclusive, will operate in substantially the same manner as that shown in Figs. 1 to 5.

With a welding rod holder as hereinbefore described, the operator is protected against shock in the welding operation and the exposed metal portion of the holder is maintained in a relatively cool condition by means of the open frame structure.

What is claimed is:

1. A welding rod holder comprising an elongated tubular frame member, a pair of parallel arms at the forward end of said member, a wheel disposed between said arms having a diametrical opening, a pair of set screws loosely engaging through said arms and threaded into said wheel, one of said screws projecting into said opening for securing a welding rod therein, a plurality of keepers formed in the periphery of said wheel, an elongated slide bar, guide means for said bar carried by said frame member, a locking bolt carried by said bar engageable in a selected keeper, a spring constantly urging said bar forwardly to locking position, a finger piece fixed to said bar, insulating means about said finger piece, and an insulated handle fixed to the rear of said frame member.

2. A welding rod holder comprising a pair of elongated parallel frame bars, spaced connecting means between said bars, a wheel between the forward ends of said bars, means rotatably securing said wheel between said bars, said wheel having a diametrical opening, one of said wheel securing means also securing said rod in said opening, a plurality of keepers formed in the periphery of said wheel, an elongated slide bar carried by certain of said connecting means, a locking bolt at the forward end of said slide bar engageable with a selected keeper, a spring constantly urging said bar and bolt forwardly to locking position, a finger piece fixed to said bar, and an insulated handle secured to the rear of said frame bars.

References Cited in the file of this patent
UNITED STATES PATENTS

| | | |
|---|---|---|
| 1,313,572 | Baker et al. | Aug. 19, 1919 |
| 2,067,995 | Varner et al. | Jan. 19, 1937 |
| 2,174,809 | Varner | Oct. 3, 1939 |
| 2,376,943 | Smith | May 29, 1945 |